(12) United States Patent
Hayashi

(10) Patent No.: US 6,615,048 B1
(45) Date of Patent: Sep. 2, 2003

(54) CONNECTION CONTROL METHOD AND SYSTEM FOR MOBILE COMMUNICATION SYSTEM

(75) Inventor: Junichi Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/558,806

(22) Filed: Apr. 26, 2000

(30) Foreign Application Priority Data

Jun. 29, 1999 (JP) .......................................... 11-184238

(51) Int. Cl.⁷ ................................................. H04Q 7/20
(52) U.S. Cl. ........................ 455/456; 455/88; 455/403; 340/3.5; 342/357.01
(58) Field of Search ................................. 455/422, 456, 455/88, 12.1, 403; 340/3.5; 342/357.1

(56) References Cited

U.S. PATENT DOCUMENTS

| | | | | |
|---|---|---|---|---|
| 5,235,633 A | * | 8/1993 | Dennison et al. | 342/357.1 |
| 5,940,764 A | * | 8/1999 | Mikami | 455/403 |
| 6,011,973 A | * | 1/2000 | Valentine et al. | 342/357.07 |
| 6,122,486 A | * | 9/2000 | Tanaka et al. | 455/456 |
| 6,128,485 A | * | 10/2000 | Mori et al. | 455/422 |
| 6,201,973 B1 | * | 3/2001 | Kowaguchi | 342/357.05 |

FOREIGN PATENT DOCUMENTS

| | | | | |
|---|---|---|---|---|
| JP | 6-85740 | | 3/1994 | |
| WO | WO 9907167 | * | 7/1998 | H04Q/7/22 |
| WO | WO 9955102 | * | 4/1999 | H04Q/7/20 |

* cited by examiner

*Primary Examiner*—Thanh Cong Le
*Assistant Examiner*—Andrew T Harry
(74) *Attorney, Agent, or Firm*—Katten Muchin Zavis Rosenman

(57) ABSTRACT

A connection control system for a mobile communication network comprising means for (a) classifying services of base stations according to service levels and (b) for storing, in each of the base stations, identification information corresponding to one or a plurality of providable service levels in a memory part, and (c) for comparing a service level requested by a mobile station with the one or plurality of providable service levels based on the identification information stored in the memory part. Then selecting, in each base station, a service to be provided on the basis of the comparison described in step (c), so that services of service levels independently established for every area can be provided to the mobile stations each registered in a respective one of the base stations.

28 Claims, 16 Drawing Sheets

FIG. 6

| SERVICE LEVEL | CONTENTS OF PROVIDABLE SERVICES |
|---|---|
| A (DEFAULT) | ALL SERVICES |
| B | SWITCH RINGING TONE TO ANOTHER WAY NOT USING SOUND |
| C | SERVICE OTHER THAN SPEECH COMMUNICATION |
| D | NOTIFY OF ONLY HISTORY OF INCOMING CALL |
| E | AUTOMATICALLY TRANSFER TO ANSWERING SERVICE |
| F | DISCONNECT |

FIG. 7

| | | CALLED SIDE | | | | |
|---|---|---|---|---|---|---|
| | | NO REQUEST FOR AVOIDANCE | RINGING TONE MAKES TROUBLE BUT SPEECH COMMUNICATION IS OK. | RINGING TONE AND SPEECH COMMUNICATION MAKE TROUBLE | SPEECH COMMUNICATION, RINGING TONE AND DATA COMMUNICATION MAKE TROUBLE | REJECT ALL COMMUNICATIONS INCLUDING DATA COMMUNICATION |
| CALLING SIDE | NO REQUEST FOR AVOIDANCE | A,B,C,D | B,C,D,E | C,D,E | D,E | E,F |
| | RINGING TONE MAKES TROUBLE BUT SPEECH COMMUNICATION IS OK. | B,C,D,E | B,C,D,E | C,D,E | D,E | E,F |
| | RINGING TONE AND SPEECH COMMUNICATION MAKE TROUBLE | C,D,E | C,D,E | C,D,E | D,E | E,F |
| | SPEECH COMMUNICATION, RINGING TONE AND DATA COMMUNICATION MAKE TROUBLE | F | F | F | F | F |
| | REJECT ALL COMMUNICATIONS INCLUDING DATA COMMUNICATION | F | F | F | F | F | ns # CONNECTION CONTROL METHOD AND SYSTEM FOR MOBILE COMMUNICATION SYSTEM

BACKGROUND OF THE INVENTION

1. Field of the Invention

The present invention relates to a connection control method and system for a mobile communication system forming communications areas with a plurality of cells such as a portable telephone system, personal handphone system (PHS) or paging system.

When a communication takes place in mobile communication systems, it is required to prevent the communication from making trouble (interfering with other activities) around the places where the communication service is utilized.

Recently, there have been increasing cases where usage of mobile communications (for example, a speech communication, and a ringing tone) in public places (for example, a train, movie theater, concert hall, waiting room, and place of testing) has disturbed many people in the vicinity of the around mobile stations. Particularly, trouble in movie theaters, concert halls and places of testing can be so serious that the persons who manage these facilities are required to avoid occurrence of such troubles.

On the other hand, it is incumbent on the mobile communication users to exercise social responsibility. Although the users are requested not to use the mobile stations in limited areas or are requested to turn off power, satisfactory results are not generally obtained. For example, the users may fail to turn off power. Therefore, the requirement to restrict use of communication services in a particular facility which provides services which need silence remains unfulfilled.

The above-mentioned background needs a harmonization between convenience in use of radio waves and social responsibility.

2. Description of the Related Art

FIG. 1 is a diagram of prior art. References #1, #2 and #3 respectively indicate areas in which mobile communication services of base or center stations CS1, CS2 and CS3 are providable. A reference #4 indicates an area in which use of mobile communication services is restricted. It is assumed that a mobile station MS is located in area #4.

Conventionally, a facility management person involved in area #4 merely requests the users not to use the mobile stations or requests the users to practice self-control.

FIG. 2 is a diagram of another prior art. In order to prevent mobile communication services from being available in use-limited area #4, the areas #1 and #3 of the base stations CS1 and CS3 are arranged so as not to overlap the use-limited area #4. However, the degree of freedom of arrangement of the service areas is decreased when it is wished to positively define a particular area in which the mobile communication services are not available. If a use-limited area is requested to be defined within an existing service area, it is necessary to rearrange the peripheral areas on a large scale.

FIG. 3 is a diagram of yet another prior art. In a case where it is requested to define a use-limited area in the existing service area #2, an interference wave emitting device capable of emitting a very strong interference wave sufficient to cover the frequency band for use in mobile communication services is employed. The use of mobile communications within the range which the radio wave reaches is interfered with, and is thus forcedly restricted.

However, there are drawbacks in the systems shown in FIGS. 1 through 3.

In the system shown in FIG. 1, it is very difficult to cause the users to keep the rules. It is impossible to cope with an accident of missing turnig off power.

In the system shown in FIG. 2, it is difficult to cope with minute demands on the use-limited areas and a request to define a use-limiting area in the existing system. There is also another drawback in which an insensitive area is likely to be eventually formed. Thus, the degree of freedom of arrangement of service providable areas is low, so that the service providable areas cannot be arranged effectively and efficiently.

In the system shown in FIG. 3, regular communications that take place in the licensed or authorized situation are intentionally interfered with. This is contrary to the laws and regulations, and is not practicable.

Even if the system shown in FIG. 3 is lawfully authorized, an interference directed to a particular communication in an area eventually prevents communications with all mobile stations in the area from taking place. Thus, all types of communication services become unavailable to all. This holds true even for communication services that are not likely to make trouble for those around the mobile station or its operator. It will be noted that a similar problem occurs in the system shown in FIG. 2. It is very difficult to acknowledge the current environments of the places at which the users are located, that is, to determine whether the users are located in any of the service providable areas. Thus, the users cannot be informed of the reason why the mobile communication services are not available at the places. This degrades effectiveness and reliability of mobile communication services themselves.

SUMMARY OF THE INVENTION

It is a general object of the present invention to efficiently and effectively prevent communications from making trouble for those around the mobile station or its operator while providing minimum communication services.

This object of the present invention is achieved by a connection control method for a mobile communication system, comprising the steps of: (a) classifying services of base stations according to service levels; (b) storing, in each of the base stations, identification information corresponding to one or a plurality of providable service levels in a memory part; (c) comparing a service level requested by a mobile station with the one or plurality of providable service levels based on the identification information stored in the memory part; and (d) selecting, in each base station, a service to be provided on the basis of a result of the step (c), so that services of service levels independently established for every area can be provided to the mobile stations each registered in a respective one of the base stations.

The above object of the present invention is also achieved by a connection control method for a mobile communication system, comprising the steps of: (a) classifying services of base stations according to service levels; (b) storing, in each of the base stations, identification information corresponding to one or a plurality of providable service levels in a memory part; (c) registering, at the time of registering location information concerning a mobile station in a management center, the identification information stored in the memory part of a base station having an area in which said mobile station is located so that the location information is related to the identification information; (d) comparing, in a communication network, a service level requested by a calling mobile station with the one or plurality of providable service levels based on the identification information stored in the memory part together with registered location information concerning a called mobile station; and (e) selecting, in each base station, a service to be provided on the basis of a result of the step (d), so that services of service levels independently established for every area can be provided to the mobile stations each registered in a respective one of the base stations.

Another object of the present invention is to provide a connection control device implementing the above-mentioned method and a base station also implementing the method.

Yet another object of the present invention is to provide a management center, and a mobile communication system involved in the method.

BRIEF DESCRIPTION OF THE DRAWINGS

Other objects, features and advantages of the present invention will become more apparent from the following detailed description when read in conjunction with the accompanying drawings, in which:

FIG. 6 shows providable service levels;

FIG. 7 shows a relationship between troubles to be avoided and providable services;

DESCRIPTION OF THE PREFERRED EMBODIMENTS

Figure 1:
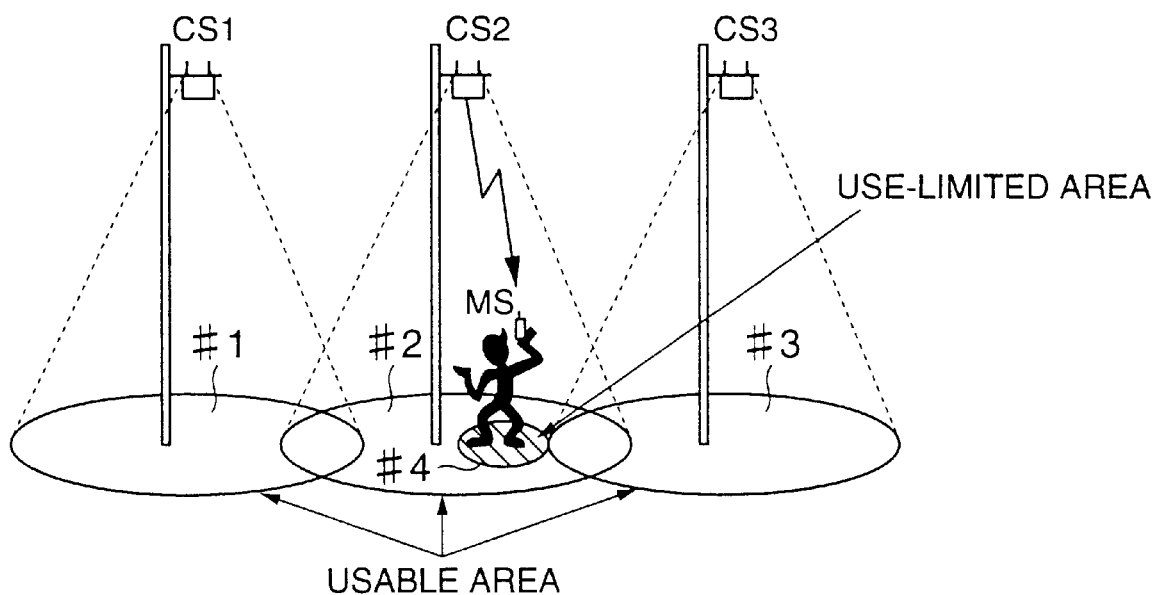
FIG. 1 is a block diagram of a first conventional system.
Figure 2:
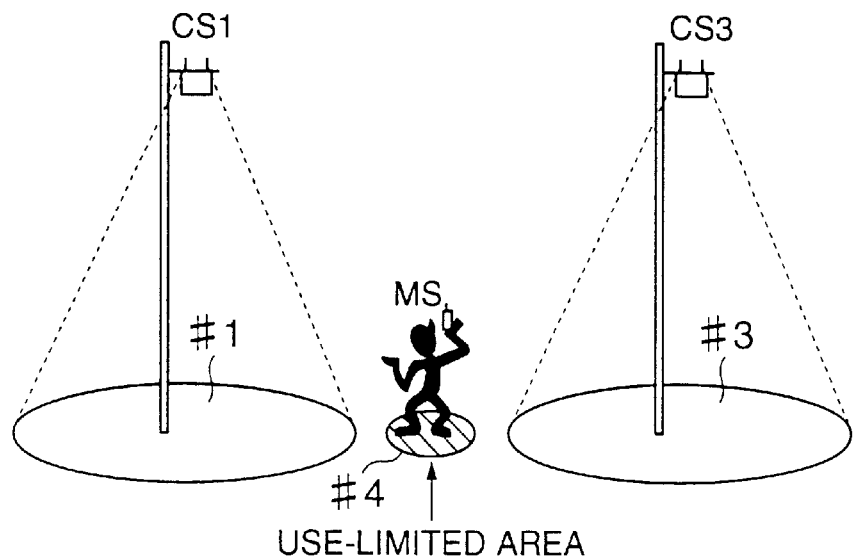
FIG. 2 is a block diagram of a second conventional system.
Figure 3:
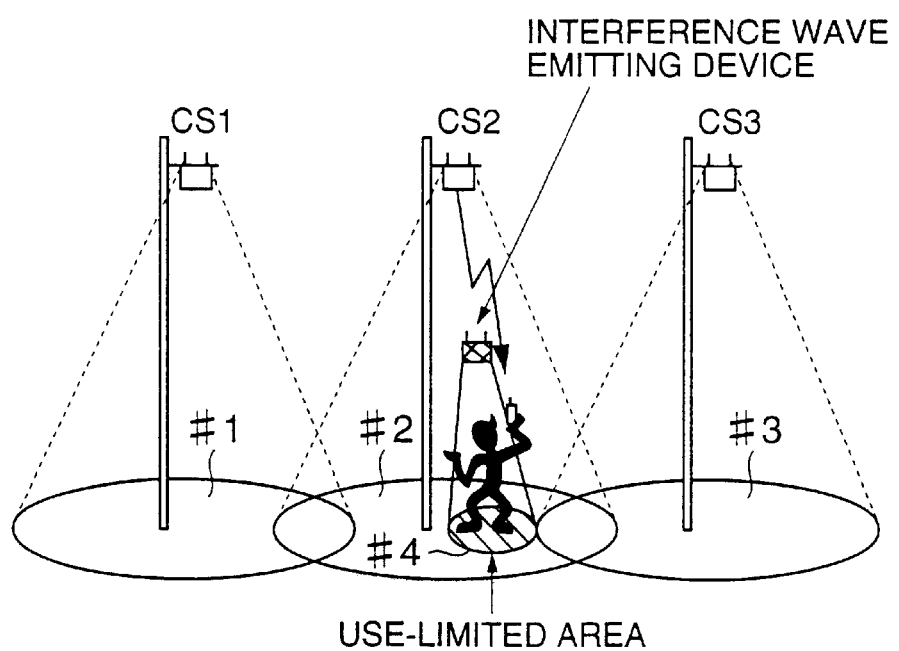
FIG. 3 is a block diagram of a third conventional system.
Figure 4:
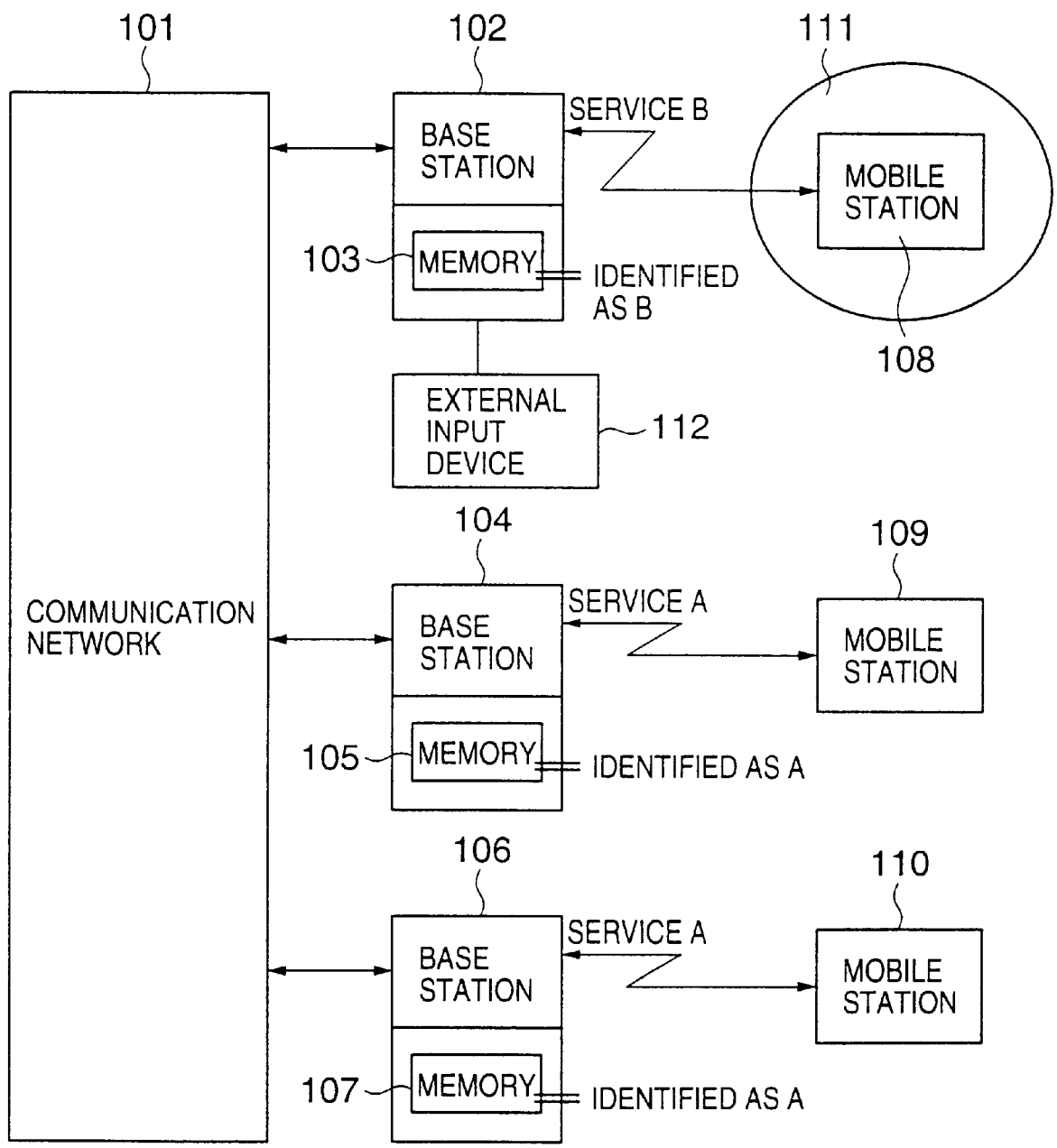
FIG. 4 is a block diagram of the principle of the present invention.

FIG. 4 is a block diagram of the principle of the present invention.

A mobile communication system shown in FIG. 4 has a structure in which a plurality of cells cover service areas. Such a structure is usually called a cellular system. A communication network 101 makes a connection with a destination base station upon a request from a source base station. The source and destination base stations can communicate with each other via the communication network 101. The communication network 101 performs a given control for communications. Further, the communication network 101 includes a management center, which registers and manages information on the locations of mobile stations.

A base station 102, which is connected to the communication network 101, is identified as base station B which registers the location of a mobile station in a particular-service providable area (for example, an area in which the use of services is limited) 111. The particular-service providable area 111 is, for example, a particular facility or area. The services are classified according to a plurality of levels based on the situation of the areas. The particular-service providable area is assigned one of the levels based on the situation thereof.

Base stations 104 and 106 are connected to the communication network 101. It is assumed that each of the base stations 104 and 106 is identified as base station A which registers the locations of mobile stations which do not receive a particular service. Memories 103, 105 and 107 are respectively provided to the base stations 102, 104 and 106. The memories 103, 105 and 107 may be provided in the base stations 102, 104 and 106 or the outside thereof. The memories 103, 105 and 107 store identification codes based on the providable service levels for the respective areas.

A mobile station 108 is registered in the base station 102, which forms the particular-service providable area 111. Mobile stations 109 and 110 are respectively registered in the base stations 104 and 106, which form areas in which the particular service is not provided.

According to an embodiment of the present invention, each base station includes a memory part storing identification information based on the level of a providable service, and a comparing part which compares a service level requested by a mobile station with a providable service level based on the identification information registered in the memory part. The services respectively providable by the base stations are selected based on comparison results respectively obtained in the base stations. Thus, it is possible to provide services of service levels independently established for each area.

According to another embodiment of the present invention, each base station includes a memory part storing identification information based on a level of a providable service. At the time of registering location information concerning a mobile station in a management center, the identification information stored in the memory part having an area in which said mobile station is located is registered in the management center so that the location information is related to the identification information. In a communication network, a service level requested by a calling mobile station is compared with the providable service levels based on the identification information stored in the memory part together with registered location information concerning a called mobile station. In each base station, a service to be provided is selected on the basis of the comparing result, so that services of service levels independently established for every area can be provided to the mobile stations each registered in a respective one of the base stations.

Each base station may be equipped with an interface with an external input device (external operation means).

When the mobile station 110 located in an area of the base station 106 which does not have a use-limited service initiates a call addressed to the mobile station 108 located in the area 111 of the base station 101 which is subject to a use-limited service, a providable service level (see FIG. 7) is selected based on the identification information stored in the memory 103 of the base station 102 or identification information registered in the management center 4. If the service requested by the mobile station 110 is registered as the providable service, a connection with the base station 102 is made. If not, the mobile station 110 is notified of another providable service or is provided a message indicating that there is no available service.

If it is requested to define a particular service area in which a particular service should be provided, the identification code based on the degree of trouble (tolerable service level) is assigned to the base station involved in the particular service area. Thus, the base station can provide only the service of the service level based on the identification information. Thus, it is possible to definitely prevent a mobile station located in the particular service area from making trouble and to provide the mobile station with the service of the service level based on the identification code.

The external input device 112 can change the identification information concerning each base station by a remote operation at any time. Thus, a person who manages a facility can arbitrarily select a desired service to be provided in the facility for a desired time period.

Figure 5:
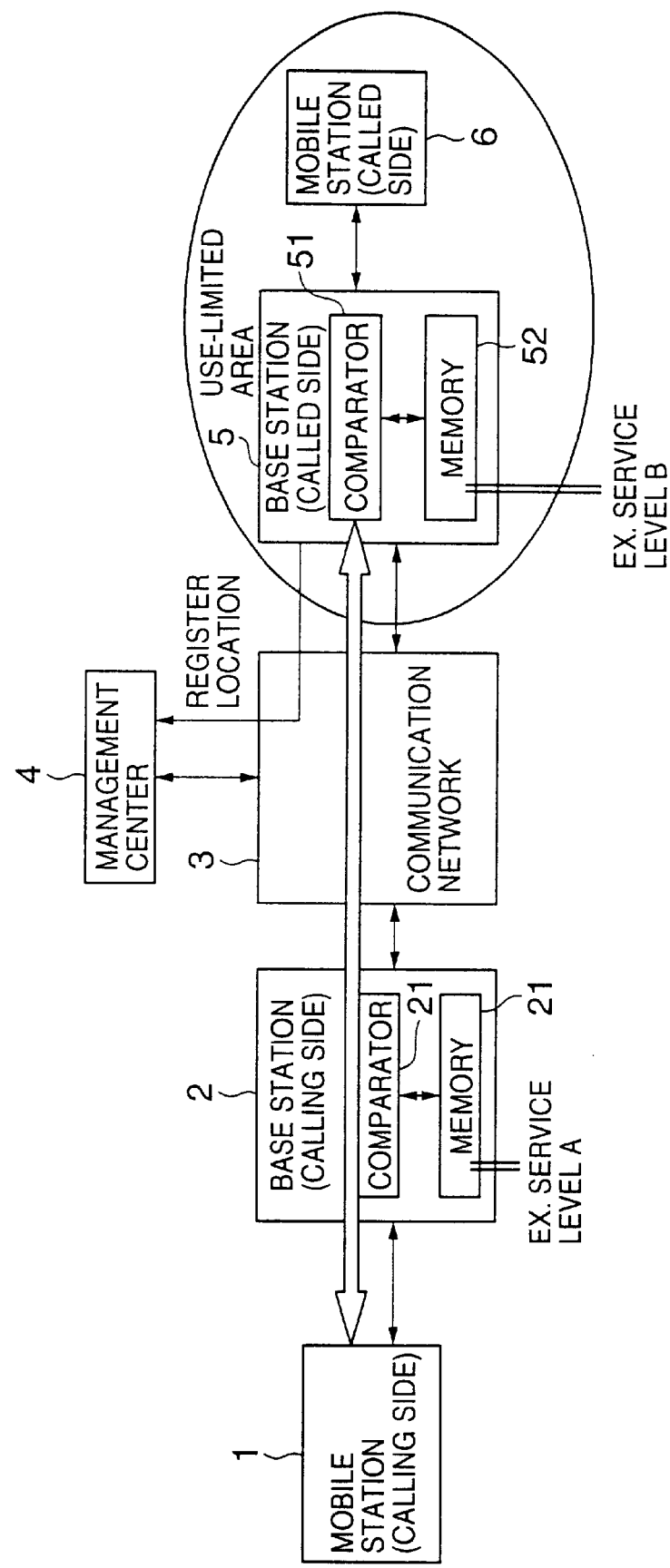
FIG. 5 is a block diagram of a first embodiment of the present invention.

FIG. 5 shows a mobile communication system according to a first embodiment of the present invention. The system shown in FIG. 5 includes a base station 2 forming an area in which a mobile station 1 on a calling side is located. The system includes a base station 5 forming an area in which a mobile station 6 on a called side is located.

The base stations 2 and 5 are connected via a communication network 3, which selects a destination upon receiving a request from an arbitrary source base station, and controls a communication with the destination mobile station. A management center 4 is connected to the communication network 3, and registers information concerning the locations of the mobile stations. When the mobile station 1 initiates a call, the management center 4 informs, based on registered location information, the communication network 3 of which area the called mobile station is located in. Thereby, a connection between the base station 2 on the calling side and the base station 5 on the called side can be made. The management center 4 can be formed by a home memory station or the like.

It is assumed that a use-limited area is defined in the area of the base station 5. The use-limited area is classified according to the following five levels taking into account the degree of trouble caused by the usage of mobile communications:

(1) (first degree) an area having no request for avoidance;
(2) (second degree) an area in which the ringing tone makes trouble but speech communication is acceptable;
(3) (third degree) an area in which both the ringing tone and speech communication make trouble;
(4) (fourth degree) an area in which the ringing tone, speech communication, and data communication make trouble; and
(5) (fifth degree) an area in which all communications including data communication make trouble and are desired to be excluded.

FIG. 6 shows services providable in the areas of the base stations classified according to the service levels. In FIG. 6, six service levels A through F that will be described below are defined as providable services.

Service level A: it is set as a default value and there are no limitations on use.

Service level B: when the ringing tone makes trouble for those around the mobile station, the user is informed by an indicating method other than sound, such as vibration.

Service level C: when the ringing tone and speech communication makes trouble for those around the mobile station, service other than speech communication such as data communication is provided.

Service level D: when the ringing tone, speech communication or data communication makes trouble for those around the mobile station, the mobile station or its user is informed of only the record of incoming calls.

Service level E: when any communication makes trouble for those around the mobile station, a call is automatically transferred to an answering machine.

Service level F: when any communication makes trouble for those around the mobile station, a call is rejected and communication is forcedly disconnected.

The use-limited area is not limited to a case where a called mobile station is located in the use-limited area but may be applied to a case where a calling mobile station is located in the use-limited area. In the above cases, a decision as to which service level can be provided for a communication between mobile stations is made based on the combination of the degree of trouble caused in the area in which the calling mobile station is located and the degree of trouble caused in the area in which the called mobile station is located.

FIG. 7 shows a table showing which services (service levels) can be provided with regard to combinations of the degree of trouble in the area in which the calling mobile station 1 on the calling side and the degree of trouble in the area in which the called mobile station 6 on the called side. Referring to the table shown in FIG. 7, in a case where the area in which the mobile station 1 is located has the aforementioned first degree of trouble, if the area in which the mobile station 6 is located has the second degree of trouble, the services of the services levels B, C, D and E can be provided. In the above case, if the area in which the mobile station 6 is located has the third degree of trouble, it is possible to provide the services of the service levels C, D and E. In a case where the area in which the mobile station 1 on the calling side is located has the third degree of trouble, if the area in which the mobile station 6 on the called side is located has the second degree of trouble, the services of the service levels C, D and E can be provided. In the above case, if the area in which the mobile station 6 is located has the third degree of trouble, the services of the services levels C, D and E can be provided as well.

As shown in FIG. 5, the base stations 2 and 5 are respectively equipped with comparator parts 21 and 51 and memory parts 22 and 52. The memory parts 22 and 52 are readable and programmable memories, and store the identification codes determined based on the degrees of trouble in the use-limited areas within the areas formed by the base stations. It can be said that the degree of trouble in the use-limited area corresponds to the service level which can be provided in the use-limited area. In this regard, the identification code may be determined based on the service level that can be provided in the associated area.

The comparator parts 21 and 51 compare the identification codes stored in the memory parts 22 and 52, namely, the identification codes indicating the degrees of trouble in the associated areas with a service type code indicating a service type (for example, a speech communication or data communication) requested by the calling mobile station 1 by referring to the table shown in FIG. 7, and thus determine whether a requested connection should be made.

Figure 8:
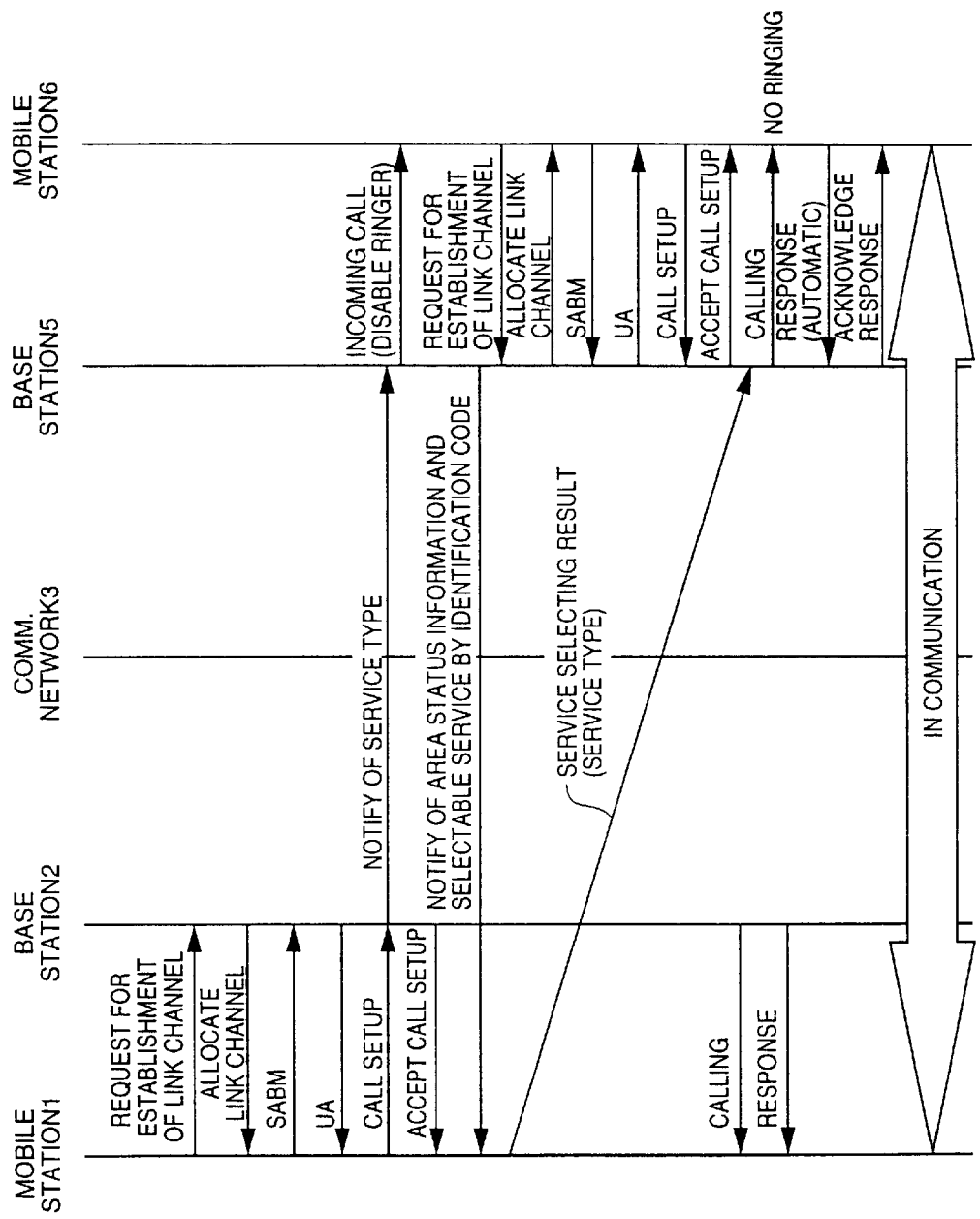
FIG. 8 is a control sequence of the first embodiment of the present invention.

A description will be given, with reference to a control sequence shown in FIG. 8, of a connecting operation of the mobile communication system according to the first embodiment of the present invention.

Upon a request from the facility management person who wishes to avoid a trouble being made in an area, the degree of trouble which should be assigned to the above area is determined, and the corresponding identification code is registered in the base station which covers the area. In the example shown in FIG. 8, the called mobile station 6 is located in the use-limited area which has the third degree of trouble. Thus, the identification code corresponding to the third degree of trouble is registered in the memory part 52 of the base station 5 which has the area including the use-limited area.

There is no request for a use-limited area within the area of the base station 2 in which the calling mobile station 1 is located. Thus, the identification code which does not limit the use of the services (a default value of service level A) is registered in the memory part 22.

Figure 9:
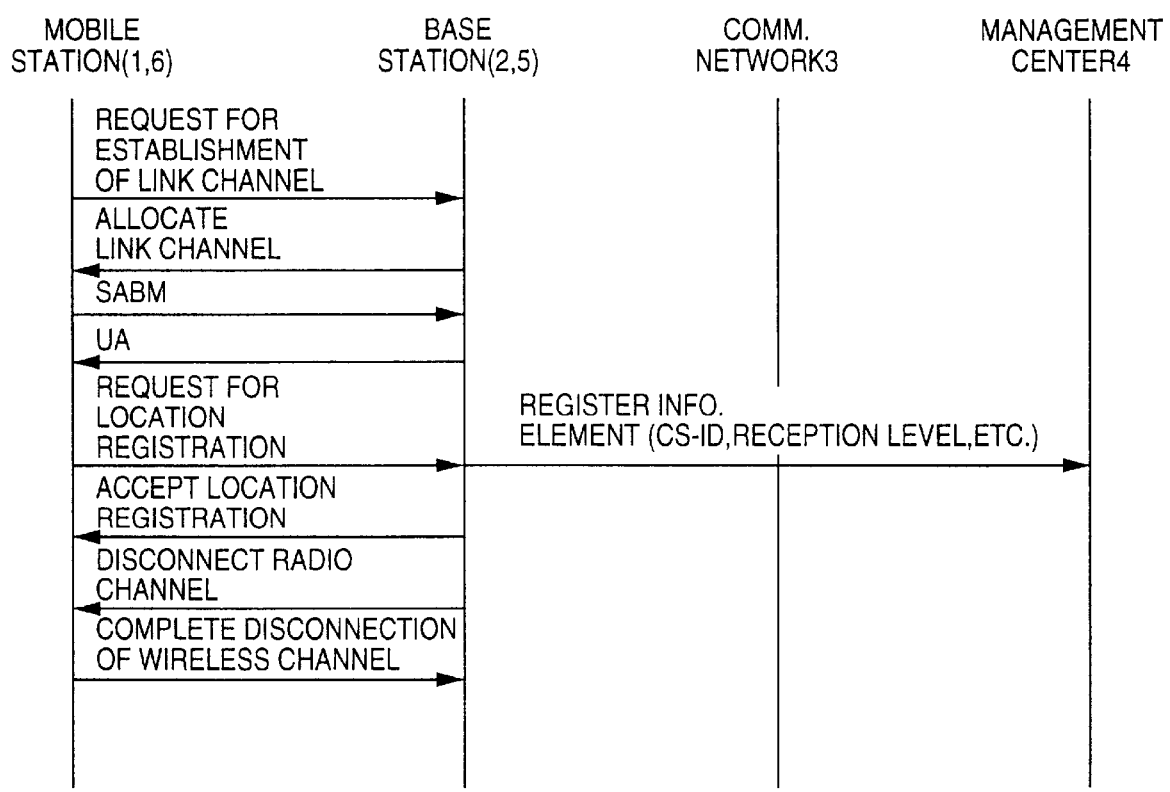
FIG. 9 is a control sequence performed at the time of location registration in the first embodiment of the present invention.

Upon a request for registration of location information from each mobile station, the location information indicating the areas in which the locations of the respective mobile stations are located is registered in the management center 4. FIG. 9 shows a control sequence of registration of the location information. When the location information stored in each mobile station does not coincide with the information broadcast by the base station (for example, when it is detected that each mobile station moves to a neighboring area or when a power switch of each mobile station is turned on), the sequence of registration of the location information is initiated in response to the request for location registration from each mobile station.

In the control sequence shown in FIG. 9, a connection making sequence initiated by a mobile station makes a connection between the above mobile station and the associated base station. Thereafter, the mobile station issues a request for location registration to the associated base station. Thus, the information on the location of the mobile station (base station identification number CS-ID and a reception level) is registered in the management center 4. Then, the mobile station is notified of a location registration acknowledgement, and the wireless or radio channel is disconnected.

In the above-mentioned state, when the mobile station 1 initiates a call addressed to the mobile station 6, the given sequence (including a link channel establishment request, a link channel allocation, SABM (asynchronous parallel mode setting command), UA (SABM reception acknowledgement) and so on) makes a connection between the base station 1 and the base station 2. Then, the mobile station 1 performs the call setup, and the communication network 3 searches for the location information on the mobile station 6 registered in the management center 4. Based on the location information thus obtained, the communication network 3 makes a connection with the base station 5 having the area in which the mobile station 6 is located. Thus, an alert signal including a notification of the service type of the mobile station 1 is sent to the base station 5 on the called side from the base station 2 on the calling side. It is now assumed that the service type is speech communication.

Eventually, the base station 5 sends a call terminating request to the mobile station 6. The call terminating request includes information instructing a ringer or the like (means for notifying an incoming call by sound) to be disabled. Then, the mobile station 6 executes a given sequence (including the link establishment request, link channel allocation, SABM, UA, call setup and call setup acknowledgement), and waits for a call from the base station 5.

The base station 5 compares the service identification code requested by the mobile station 1 with the identification code registered in its own memory part 52, and determines whether a connection should be made.

If the result of the determination is affirmative, the base station 5 proceeds with the connection making sequence, and sends a calling signal to the mobile station 6. If a response is issued from the mobile station 6, the base station 5 connects the mobile station 1 on the calling side and the mobile station 6 on the called side.

If the result of the above determination is negative, as shown in the connection making sequence of FIG. 9, the base station 5 notifies, via the communication network 3, the mobile station 1 of the status information (the degree of trouble) on the area of the base station 5 and another selectable service providable in the above area by referring to the identification codes stored in the memory part 52.

The mobile station 1 on the calling side receives the message of the selectable service from the base station 5, and then selects a new connectable communication service based on the received message. Then, the mobile station 1 notifies the communication network 3 of the service type thus selected. It is assumed that data communication is selected as the new service type in the embodiment of concern.

In the base station 5 on the called side, the comparator part 51 detects that the connection can be made. Thus, the base station 5 proceeds with the connection making sequence, and sends the calling signal for data communication to the mobile station 6 on the called side. The called mobile station 6 receives the calling signal, and automatically sends back the acknowledgement signal. In the present case, the mobile station 6 has been instructed not to output the ringing tone at the time of receiving the incoming call. Thus, the ringer which generates the ringing tone is not driven.

The mobile station 1 is notified of calling of the mobile station 6 and the acknowledgement sent therefrom. Thus, a communication path between the mobile stations 1 and 6 is established, and a data communication takes place over the communication path.

In the example mentioned above, if it is determined that a connection based on the original service type of the mobile station 1 cannot be made, the communication is not disconnected but continues by selecting another service type. However, the present invention is not limited to the above but may perform the following. If a connection cannot be made, the mobile station 1 is notified of connectable service types available and is invited to make a call again. Then, the communication is disconnected. Thereafter, the mobile station 1 makes a call again while selecting another connectable service type.

The mobile station 6 receives only a limited service as long as it is registered in the base station 5 forming the use-limited area. Thus, it is possible to prevent the mobile station 6 from making trouble irrespective of the status of the mobile station 6.

Figure 10:
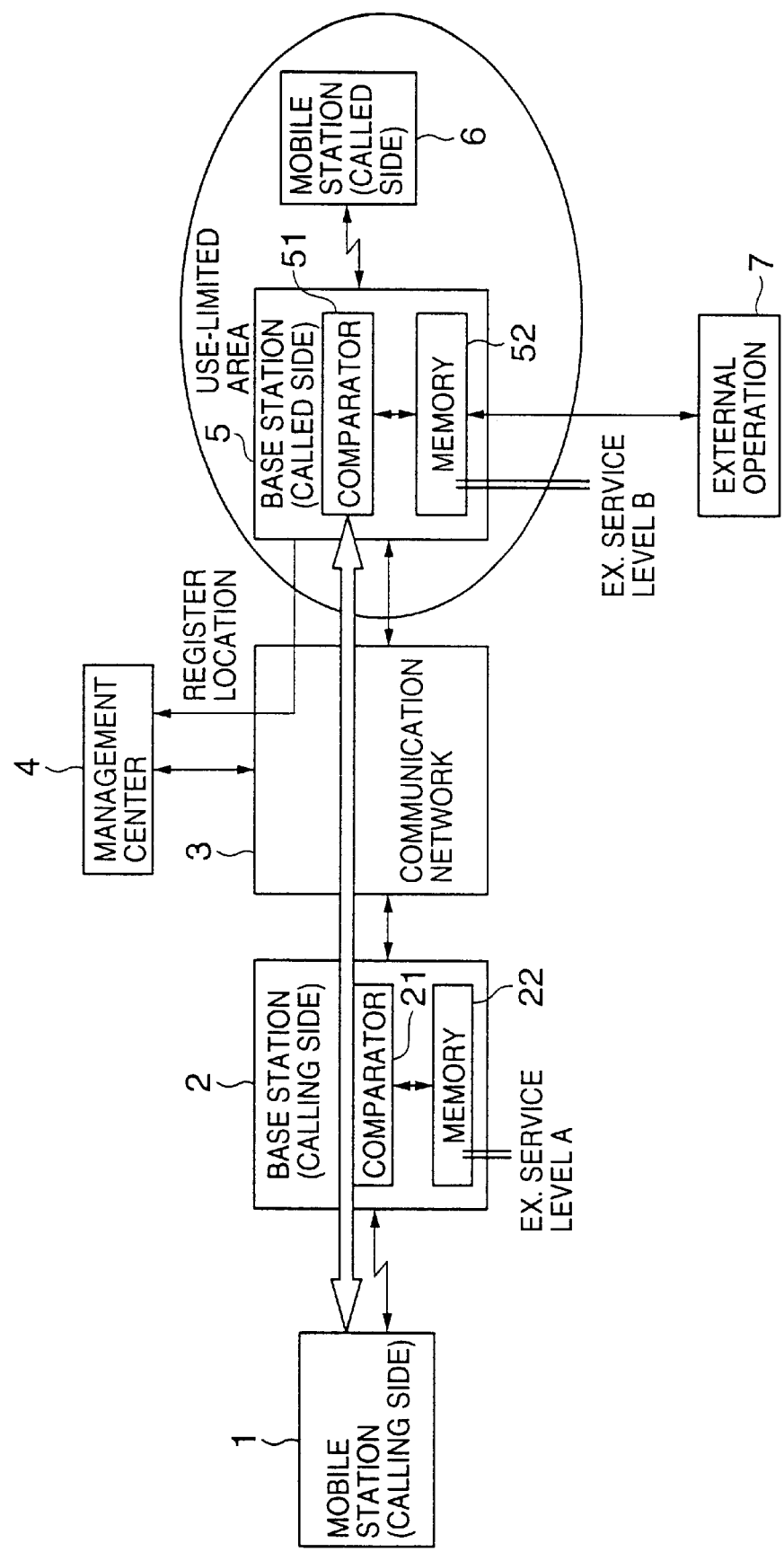
FIG. 10 is a block diagram of a second embodiment of the present invention.

FIG. 10 is a block diagram of a mobile communication system according to a second embodiment of the present invention. The second embodiment of the present invention differs from the first embodiment thereof in that the contents (that is, identification codes) of the memory part 52 can be remotely programmed from a location outside of the base station 5 by means of an external operation part 7.

A facility manager who wishes to avoid occurrence of trouble in the area formed by the base station can program the memory part 52 according to an individual circumstance. For example, a limitation on the use of mobile stations is placed during a play on the stage or performance in a theater or a movie theater. It is possible for the users to have communication services before or after a play on the stage or performance or for a break time.

Figure 11:
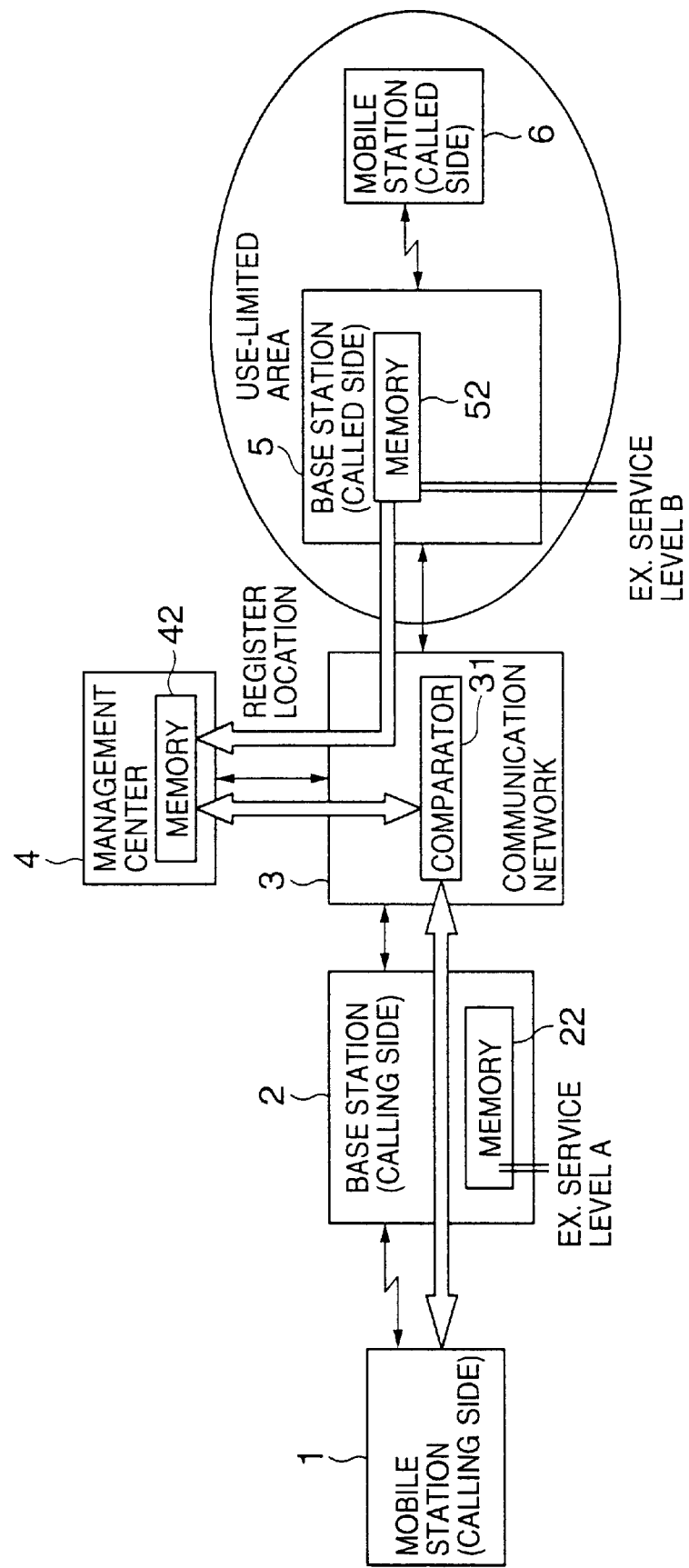
FIG. 11 is a block diagram of a third embodiment of the present invention.

FIG. 11 is a block diagram of a mobile communication system according to a third embodiment of the present invention. In the above-mentioned first and second embodiments of the present invention, the identification codes indicating the information on the limitations on the use-limited areas are registered in the base stations, and it is determined, in the base stations, whether a connection should be made by comparing the service type requested from the calling side with the registered identification codes. According to the third embodiment of the present invention, the communication network 3 makes a decision as to whether a connection should be made.

Referring to FIG. 11, when the locations of the mobile stations are registered in the management center 3, the identification code indicating the degree of trouble in the area of the base station in which the mobile station of interest is located is registered together with the information on the location of the above mobile station. When the communication network 3 makes a connection with the base station on the called side, the network 3 receives the identification code as well as the registered location information from the management center 4. The communication network 3 is equipped with a comparator part 31, which compares the identification code and the service type of the calling side with each other by referring to the table shown in FIG. 7, and thus makes a decision as to whether a communication should be made.

Figure 12:
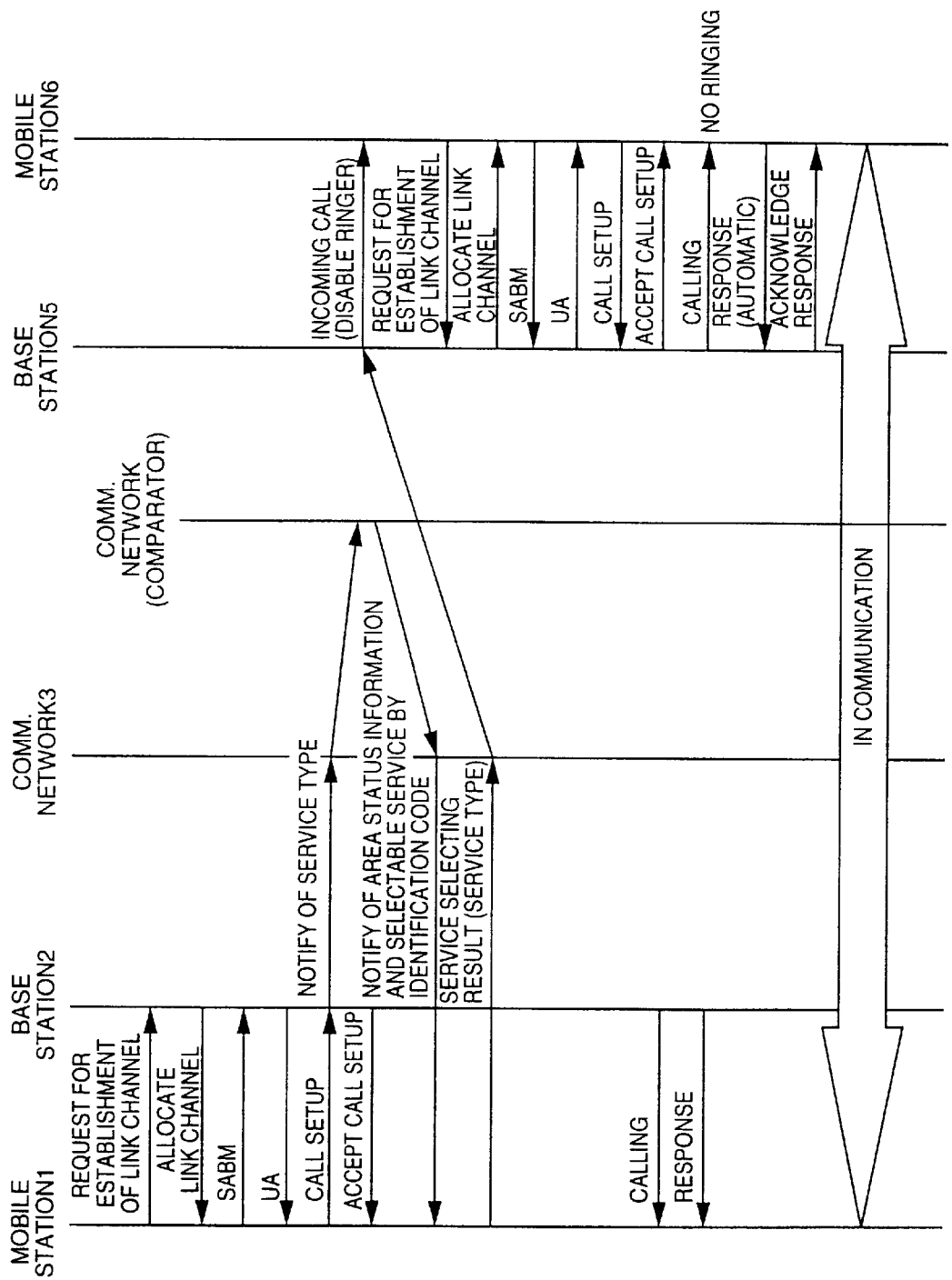
FIG. 12 is a control sequence of the third embodiment of the present invention.

A description will be given, with reference to a connection making sequence of FIG. 12, of an operation of the third embodiment of the present invention.

Figure 13:
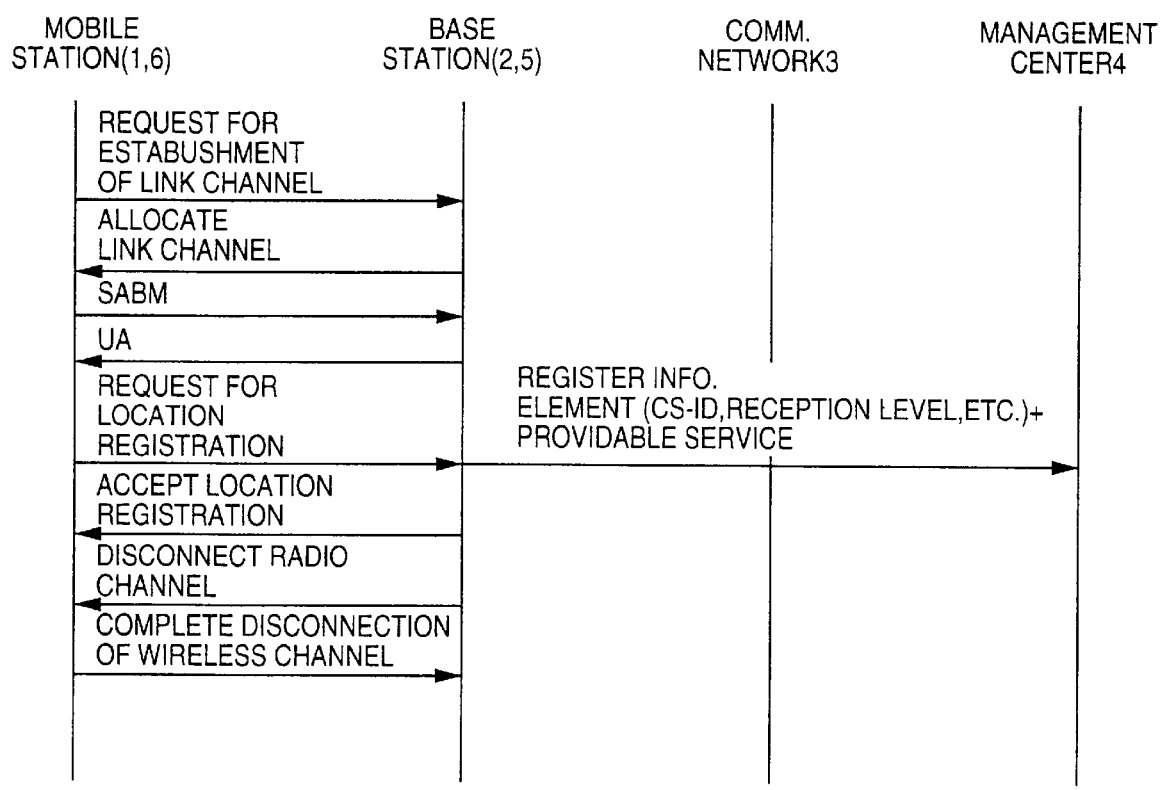
FIG. 13 is a control sequence performed at the time of location registration in the third embodiment of the present invention.

When a mobile station initiates location registration, the identification code indicating the providable service level registered in the area of the base station in which the above mobile station is located is registered in the management center 4 so that the identification code is related to the registered location information. FIG. 13 shows a control sequence performed at the time of location registration. The information to be registered from the base station to the management center 4 includes the identification code indicating the degree of trouble in the use-limited area in addition to the registered location information (the base station identification number CS-ID, the reception level and so on).

When the mobile station 1 initiates a call addressed to the mobile station 6, the communication network 3 receives, from the management center 4, the identification code indicating the degree of trouble in the use-limited area together with the registered location information. Before making a connection with the base station 5, the comparator part 31 of the communication network 3 compares the service type requested by the calling mobile station 1 with the service level connectable at the mobile station. If the connection cannot be made, the communication network 3 notifies the mobile station 1 of the area information and selectable service described by the identification code, as in the case of the first embodiment of the present invention.

If the mobile station 1 selects another (new) service type (for example, data communication as in the case of the first embodiment) in response to the above notification, the communication network 3 is notified of the newly selected service type. The comparator part 31 of the communication network 3 determines that a connection based on the newly requested service type can be made. Thus, the communication network 3 makes a connection with the base station 5 having the area in which the called mobile station 6 is located. The base station 5 initiates the connection making sequence starting with termination of the call (without driving the ringer), so that a wireless channel between the base station 5 and the mobile station 6 can be established. Thereafter, data communication takes place between the mobile stations 1 and 6.

In the example mentioned above, if it is determined that a connection based on the original service type of the mobile station 1 cannot be made, the communication is not disconnected but continues by selecting another service type. However, the present invention is not limited to the above but may perform the following. If a connection cannot be made, the mobile station 1 is notified of connectable service types available and is invited to make a call again. Then, the communication is disconnected. Thereafter, the mobile station 1 makes a call again while selecting another connectable service type.

Figure 14:
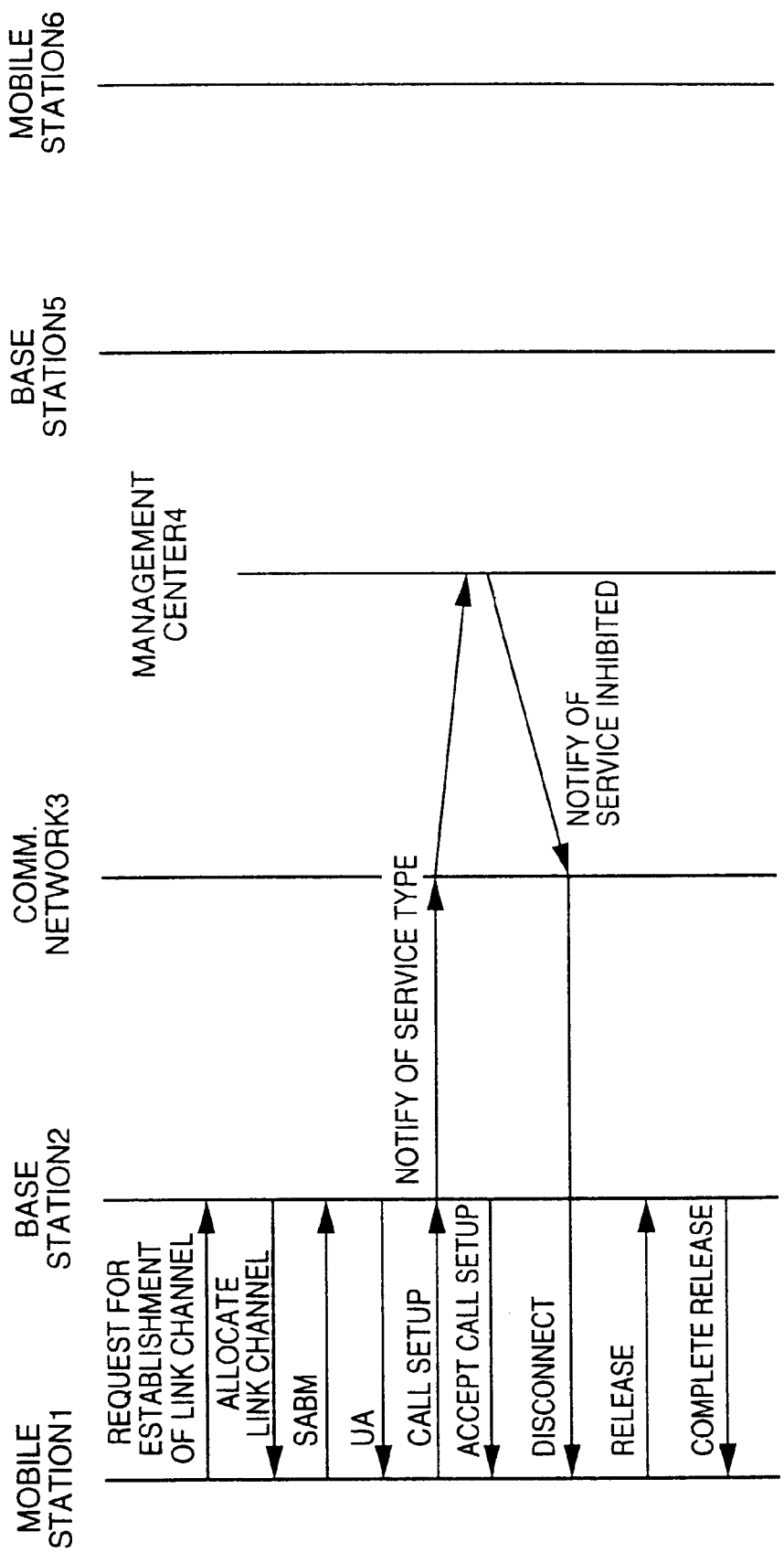
FIG. 14 is another control sequence of the third embodiment of the present invention.

If the area formed by the base station 5 in which the called mobile station 6 is located is assigned the fifth degree of trouble (all communications including data communication should be rejected), there are no service types providable in the mobile station 1 at all. In this case, as shown in a sequence of FIG. 14, the management center 4 notifies the mobile station 1 via the communication center 4 and the base station 2 that the area in which the mobile station is located is assigned the service level which rejects all communications (prohibition of services). Thereafter, the base station 2 disconnects the wireless channel with the mobile station 1. In this case, the service levels E and F may be selected based on the identification codes registered in the base station 5. The above-mentioned process corresponds to the service level F. With regard to the mobile station 6, if an automatic transfer such as an answering service is registered on the network side beforehand, it is possible to execute the service level E and transfer the call to the transfer destination rather than disconnect the call.

In the description of the third embodiment of the present invention, the calling mobile station 1 is located in the area on which no limitation is placed, that is, the area assigned the first degree of trouble (no request for avoidance). If the mobile station 1 is located in an area assigned the second degree of trouble (speech communication is permitted whereas the ringing tone makes trouble) or the third degree of trouble (both the ringing tone and speech communication make trouble), the mobile station 1 is notified of the service level based on the degree of trouble in the area in which the called mobile station 6 is located.

If the calling mobile station 1 is located in an area assigned the fourth degree of trouble (the ringing tone, speech communication and data communication make trouble) or the fifth degree of trouble (all communications including data communication make trouble), there are no service types providable in the mobile station 1 at all. In this case, the communication network 3 notifies the mobile station 1 of the above situation upon receipt of a call initiated by the mobile station 1. Alternatively, when the mobile station 1 moves to a use-limited area, and the location thereof is to be registered, the base station may notify the mobile station 1 that no communication services are providable at all.

Figure 15:
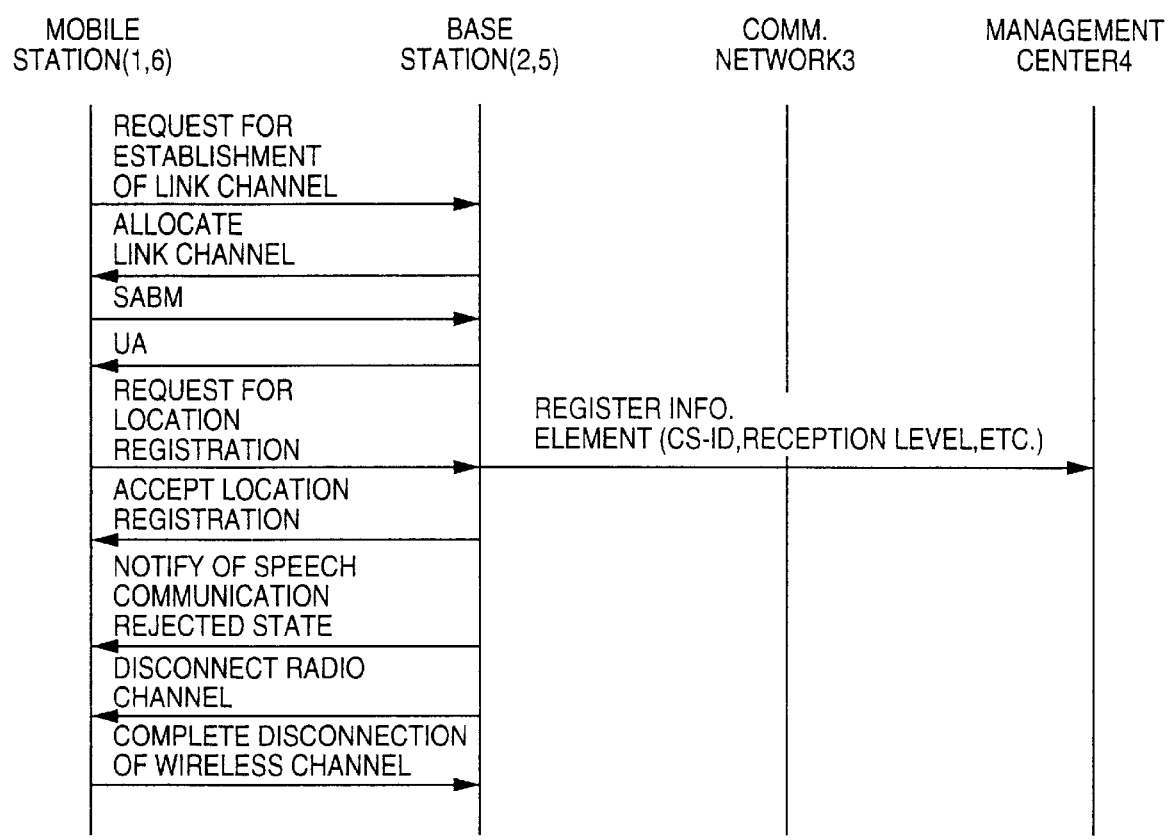
FIG. 15 is another control sequence performed at the time of location registration in the third embodiment of the present invention.

FIG. 15 shows a control sequence of registering location information. In the case being considered, the identification code registered in the base station in which the mobile station 1 is about to register its own location corresponds to the fifth degree of trouble. Thus, as shown in FIG. 15, when the normal location registration is performed starting with the mobile station 1, the mobile station 1 is notified of a message "speech-communication rejected status" after an acknowledgement of the position registration sent by the base station. Thus, rejection of speech communication is indicated on the mobile station 1, and all calling procedures are disabled.

Figure 16:
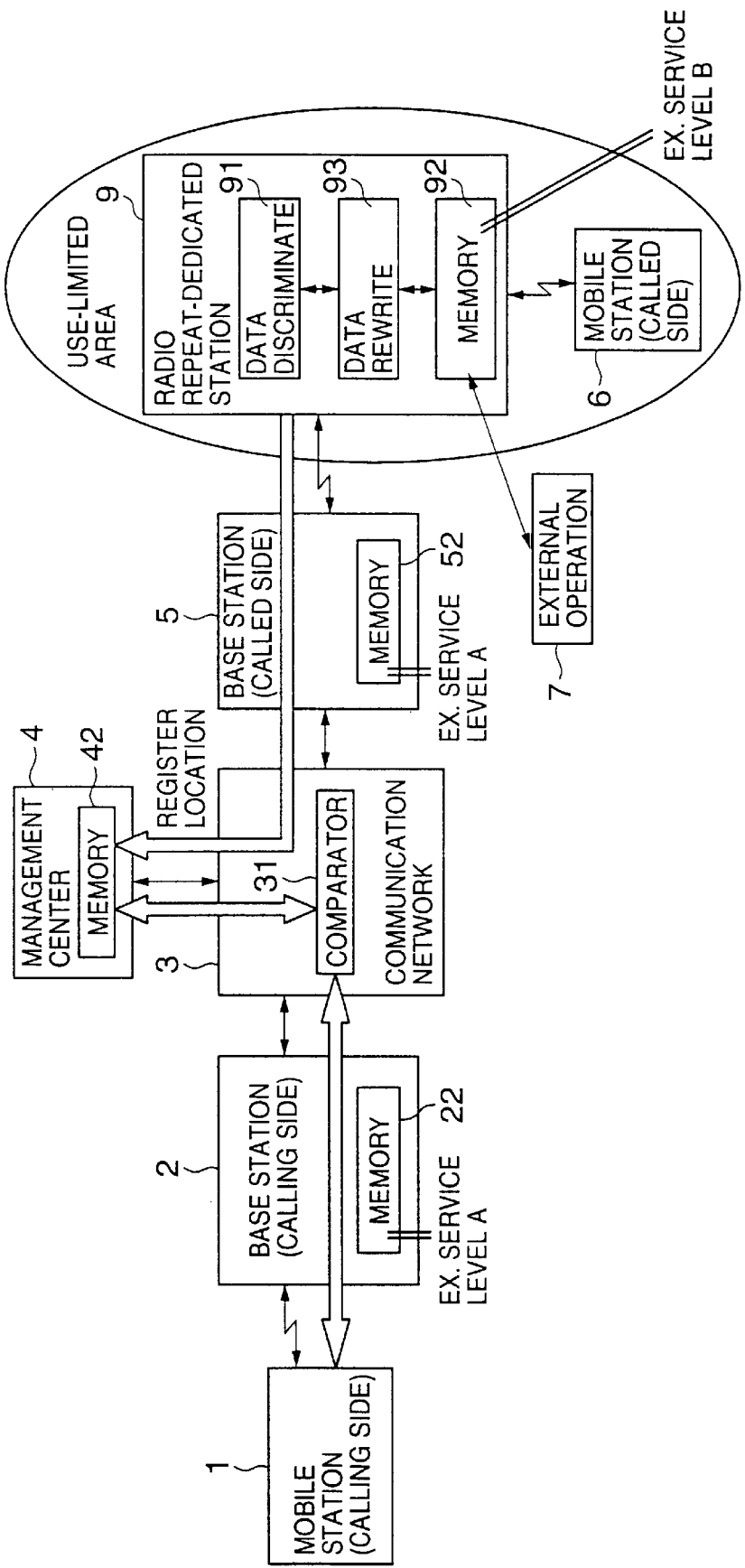
FIG. 16 is a block diagram of a fourth embodiment of the present invention.

FIG. 16 is a block diagram of a mobile communication system according to a fourth embodiment of the present invention. The fourth embodiment can cope with a situation such that a temporary limitation on use is required to be placed in a part of the existing communication area of a base station. The fourth embodiment can easily place a use-limited area in the above situation. The fourth embodiment of the present invention uses a radio repeat-dedicated station in order to meet the above requirement. Usually, a radio repeat-dedicated station is carried and installed in a place in the area in which a good wave situation is not obtained (for example, an inside of a building), and makes it possible for a communication with the mobile station to take place.

As shown in FIG. 16, the fourth embodiment of the present invention is based on the third embodiment. More particularly, in the fourth embodiment of the present invention, the identification code information is registered in the management center 4 along with the location information. The comparator part 31 of the communication network 3 determines whether a connection should be made. Further, according to the fourth embodiment of the present invention, a radio repeat-dedicated station 9 is installed in a place in which a temporary limitation on use is placed in the area of the base station 5 on the called side. The radio repeat-dedicated station 9 and the base station 5 are connected together via a radio channel. Instead of a radio channel, a wired channel may be used.

The radio repeat-dedicated station 9 is equipped with a data discrimination part 91, a memory part 92, and a data rewrite part 93. The external operation part 7 for rewriting the contents of the memory part 92 from the outside of the station 9 is connected to the memory part 92. The memory part 92 stores the identification code based on the degree of trouble in the use-limited area. The identification code registered in the memory part 92 can be remotely rewritten by the external operation part 7. The data discrimination part 91 receives a transmission wave from a mobile station when this mobile station initiates the registration sequence of its own location. Then, the data decision part 91 monitors the transmission wave, and discriminates information element parts (slots including service level information) with the discrimination codes added thereto sent together with the registered location information included in the transmission wave. The data rewrite part 93 rewrites the identification codes registered in the memory part 92 into the contents of the information element parts.

A description will be given of an operation of the fourth embodiment of the present invention.

First, the following preprocess is performed. After the radio repeater-dedicated station 9 is installed in the newly defined use-limited area, the identification code corresponding to the degree of trouble assigned to the above use-limited area is registered in the memory part 92 of the radio repeat-dedicated station 9 by means of the external operation part 7. Alternatively, the registration may be made internally. It is assumed that the management center 4 has the registered location information (the base station number and reception level) on the mobile station 6 on the called side and the identification code indicating the degree of trouble in the use-limited area in which the mobile station 6 is presently located.

The process for limitation on channel connection based on the degree of trouble in the fourth embodiment of the present invention is the same as that in the third embodiment thereof.

Figure 17:
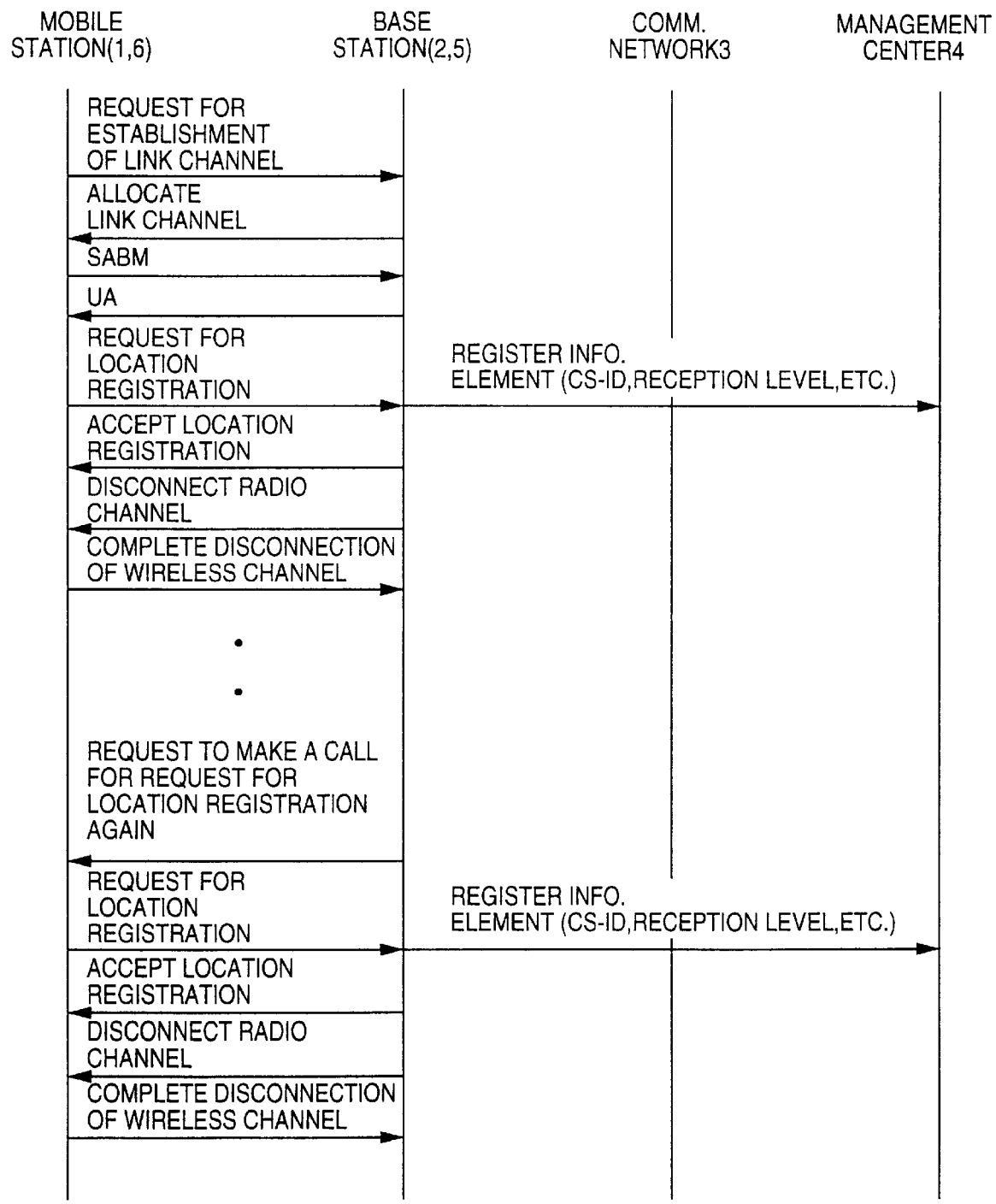
FIG. 17 is a control sequence performed at the time of location registration.

In each of the aforementioned embodiments of the present invention, the location registration sequence starting with the mobile station is initiated so that the mobile station sends a request for location registration to the network side for itself. However, the present invention is not limited to the above location registration sequence. For example, as shown in a location registration control sequence of FIG. 17, the base station forming the area that is subject to limitation on use or the radio repeat-dedicated station periodically requests each mobile station located its own communication area to register its own location again (request for re-registration). By the above control, it is possible to cope with a situation in which a mobile station already registered in another area moves to the use-limited area and another situation in which the limitation on use is changed within the same area.

The present invention is not limited to the specifically disclosed embodiments, and variations and modifications may be made without departing from the scope of the present invention.

What is claimed is:

1. A connection control method for a mobile communication system, comprising the steps of:
   (a) classifying services of base stations according to service levels;
   (b) storing, in each of the base stations, identification information corresponding to one or a plurality of providable service levels in a memory part;
   (c) comparing a service level requested by a mobile station with the one or plurality of providable service levels based on the identification information stored in the memory part; and
   (d) selecting, in each base station, a service to be provided on the basis of a result of the step (c), so that services of service levels independently established for every area can be provided to the mobile stations each registered in a respective one of the base stations.

2. The connection control method as claimed in claim 1, further comprising the steps of:
   (e) notifying a calling mobile station which initiates a call of a providable service based on the identification information when the result of the step (c) shows that a connection based on the service level requested by said calling mobile station cannot be made; and
   (f) making a connection with a called mobile station when the calling mobile station selects the providable service notified by the step (e).

3. The connection control method as claimed in claim 1, further comprising the steps of:
   (e) notifying a calling mobile station which initiates a call of a providable service based on the identification information when the result of the step (c) shows that a connection based on the service level requested by said calling mobile station cannot be made; and (f) requesting the calling mobile station to initiate a call again.

4. The connection control method as claimed in claim 1, further comprising the step of accessing the memory part and rewriting the identification information stored therein.

5. A connection control method for a mobile communication system, comprising the steps of:

(a) classifying services of base stations according to service levels;

(b) storing, in each of the base stations, identification information corresponding to one or a plurality of providable service levels in a memory part;

(c) registering, at the time of registering location information concerning a mobile station in a management center, the identification information stored in the memory part of a base station having an area in which said mobile station is located so that the location information is related to the identification information;

(d) comparing, in a communication network, a service level requested by a calling mobile station with the one or plurality of providable service levels based on the identification information stored in the memory part together with registered location information concerning a called mobile station; and (e) selecting, in each base station, a service to be provided on the basis of a result of the step (d), so that services of service levels independently established for every area can be provided to the mobile stations each registered in a respective one of the base stations.

6. The connection control method as claimed in claim 5, further comprising the steps of:

(f) notifying a calling mobile station which initiates a call of a providable service based on the identification information when the result of the step (d) shows that a connection based on the service level requested by said calling mobile station cannot be made; and (g) making a connection with a called mobile station when the calling mobile station selects the providable service notified by the step (f).

7. The connection control method as claimed in claim 5, further comprising the steps of:

(f) notifying a calling mobile station which initiates a call of a providable service based on the identification information when the result of the step (d) shows that a connection based on the service level requested by said calling mobile station cannot be made; and (g) requesting the calling mobile station to initiate a call again.

8. The connection control method as claimed in claim 5, further comprising the step of accessing the memory part and rewriting the identification information stored therein.

9. The connection control method as claimed in claim 5, further comprising the steps of:

(f) periodically sending a request to register the location information to the mobile stations from the base stations, so that a mobile station located in a use-limited area in which a limitation on use of service is placed can certainly register the location information together with the identification information.

10. The connection control method as claimed in claim 5, further comprising the steps of:

(f) registering in the management center, when a mobile station located in a particular-service providable area performs location registration via a radio repeat-dedicated station, location information on said mobile station and identification information based on a service level in the particular-service providable area registered in the radio repeat-dedicated station, which is not directly connected to the communication network but is directly connected to one of the base stations; and (g) selecting a particular service to be provided to the mobile station located in the particular-service providable area on the basis of the identification information concerning the particular-service providable area, so that a radio repeat-dedicated station can independently provide particular service.

11. A connection control system for a mobile communication system, comprising:

a memory part, provided in each of base stations providing services classified according to service levels, storing identification information corresponding to one or a plurality of providable service levels;

a comparing part, provided in each of the base stations, comparing a service level requested by a mobile station with the one or plurality of providable service levels based on the identification information stored in the memory part;

wherein a service to be provided is selected, in each of the base stations, on the basis of a result of comparing, so that services of service levels independently established for every area can be provided to the mobile stations each registered in a respective one of the base stations.

12. The connection control system as claimed in claim 11, further comprising:

a notifying part notifying a calling mobile station which initiates a call of a providable service based on the identification information when the result of comparing shows that a connection based on the service level requested by said calling mobile station cannot be made; and a connection making part making a connection with a called mobile station when the calling mobile station selects the providable service notified by the notifying part.

13. The connection control system as claimed in claim 11, further comprising:

a notifying part notifying a calling mobile station which initiates a call of a providable service based on the identification information when the result of comparing shows that a connection based on the service level requested by said calling mobile station cannot be made; and a requesting part requesting the calling mobile station to initiate a call again.

14. The connection control system as claimed in claim 11, wherein each of the base stations accesses the memory part and rewrites the identification information stored therein.

15. A connection control system for a mobile communication system, comprising:

a memory part, provided in each of the base stations providing services classified according to service levels, storing identification information corresponding to one or a plurality of providable service levels;

a registering part causing, at the time of registering location information concerning a mobile station in a management center, the identification information stored in the memory part of a base station having an area in which said mobile station is located to be registered in the management center so that the location information is related to the identification information; and a comparing part, provided in a communication network, comparing a service level requested by a calling mobile station with the one or plurality of providable service levels based on the identification information stored in the memory part together with registered location information concerning a called mobile station; and wherein a service to be provided is selected, in each of the base stations, on the basis of a result of comparing, so that services of service levels independently established for every area can be provided to the mobile stations each registered in a respective one of the base stations.

16. The connection control system as claimed in claim 15, further comprising:

a notifying part notifying a calling mobile station which initiates a call of a providable service based on the identification information when the result of comparing shows that a connection based on the service level requested by said calling mobile station cannot be made; and a connection making part making a connection with a called mobile station when the calling mobile station selects the providable service notified.

17. The connection control system as claimed in claim 15, further comprising:

a notifying part notifying a calling mobile station which initiates a call of a providable service based on the identification information when the result of comparing shows that a connection based on the service level requested by said calling mobile station cannot be made; and a requesting part requesting the calling mobile station to initiate a call again.

18. The connection control system as claimed in claim 15, further comprising a part accessing the memory part and rewriting the identification information stored therein.

19. The connection control system as claimed in claim 15, further comprising:

a part periodically sending a request to register the location information to the mobile stations from the base stations, so that a mobile station located in a use-limited area in which a limitation on use of service is placed can certainly register the location information together with the identification information.

20. The connection control system as claimed in claim 15, further comprising:

a registering part causing, when a mobile station located in a particular-service providable area performs location registration via a radio repeat-dedicated station, location information on said mobile station and identification information based on a service level in the particular-service providable area registered in the radio repeat-dedicated station to be registered in the management center, the radio repeat-dedicated station being not directly connected to the communication network but being directly connected to one of the base stations; and a selecting part selecting a particular service to be provided to the mobile station located in the particular-service providable area on the basis of the identification information concerning the particular-service providable area, so that radio repeat-dedicated stations can independently provide particular services.

21. A base station for a mobile communication system comprising:

a memory part storing identification information corresponding to one or a plurality of providable service levels, services providable in the mobile communication system being classified according to the service levels; and a comparing part comparing a service level requested by a mobile station with the one or plurality of providable service levels based on the identification information stored in the memory part, a service to be provided to the mobile station being selected on the basis of a result of comparing.

22. A base station for a mobile communication system, comprising:

a memory part storing identification information corresponding to one or a plurality of providable service levels, services providable in the mobile communication system being classified according to the service levels;

a registering part causing, at the time of registering location information concerning a mobile station located in its own area, the identification information stored in the memory part to be registered in a management center so that the location information is related to the identification information; and a comparing part comparing a service level requested by the mobile station with the one or plurality of providable service levels based on the identification information stored in the memory part, a service to be provided to the mobile station being selected on the basis of a result of comparing.

23. The base station as claimed in claim 22, further comprising:

a registering part causing, when a mobile station located in a particular-service providable area performs location registration via a radio repeat-dedicated station, location information on said mobile station and identification information based on a service level in the particular-service providable area registered in the radio repeat-dedicated station to be registered in the management center, the radio repeat-dedicated station being not directly connected to the communication network but being directly connected to one of the base stations; and a selecting part selecting a particular service to be provided to the mobile station located in the particular-service providable area on the basis of the identification information concerning the particular-service providable area, so that radio repeat-dedicated stations can independently provide particular services.

24. A management center provided in a mobile communication system, comprising:

a first part managing the mobile communication system, and a second part storing location information concerning a mobile station located in an area of a base station, and identification information concerning providable service levels, services providable in the mobile communication system being classified to the service levels, the location information and the identification information being stored so that the location information is related to the identification information.

25. The management center as claimed in claim 24, wherein:

the second part stores, when a mobile station located in a particular-service providable area performs location registration via a radio repeat-dedicated station, location information on said mobile station and identification information based on a service level in the particular-service providable area registered in the radio repeat-dedicated station, the radio repeat-dedicated station being not directly connected to the communication network but being directly connected to one of the base stations; and a particular service to be provided to the mobile station located in the particular-service providable area is selected on the basis of the identification information concerning the particular-service providable area, so that radio repeat-dedicated stations can independently provide particular services.

26. A mobile communication system comprising:

base stations;

a management center; and a communication network to which the base stations and the management center are coupled, the base stations providing services classified according to service levels, each of the base stations including:

- a memory part storing identification information corresponding to one or a plurality of providable service levels;
- a registering part registering, at the time of registering location information in the management center so that the location information of a mobile station located in its own area is related to the identification information, the communication network including a comparing part comparing a service level requested by a calling mobile station with the one or plurality of providable service levels based on the identification information stored together with registered location information concerning a called mobile station, wherein a service to be provided is selected, in each base station, on the basis of a result of comparing, so that services of service levels independently established for every area can be provided to the mobile stations each registered in a respective one of the base stations.

27. The mobile communication system as claimed in claim 26, wherein each of the base stations comprises:

a registering part causing, when a mobile station located in a particular-service providable area performs location registration via a radio repeat-dedicated station, location information on said mobile station and identification information based on a service level in the particular-service providable area registered in the radio repeat-dedicated station to be registered in the management center, the radio repeat-dedicated station being not directly connected to the communication network but being directly connected to one of the base stations; and a selecting part selecting a particular service to be provided to the mobile station located in the particular-service providable area on the basis of the identification information concerning the particular-service providable area, so that radio repeat-dedicated stations can independently provide particular services.

28. The mobile communication system as claimed in claim 26, wherein the management center comprises a memory part stores, when a mobile station located in a particular-service providable area performs location registration via a radio repeat-dedicated station, location information on said mobile station and identification information based on a service level in the particular-service providable area registered in the radio repeat-dedicated station, the radio repeat-dedicated station being not directly connected to the communication network but being directly connected to one of the base stations, wherein a particular service to be provided to the mobile station located in the particular-service providable area is selected on the basis of the identification information concerning the particular-service providable area, so that radio repeat-dedicated stations can independently provide particular services.

* * * * *